Nov. 23, 1926.

C. F. MILLICAN

COMBINATION DIE MOLD

Filed April 30, 1925 2 Sheets-Sheet 1

1,608,333

INVENTOR:
Carl F. Millican,
BY
E. T. Silvius,
ATTORNEY.

Nov. 23, 1926.
C. F. MILLICAN
COMBINATION DIE MOLD
Filed April 30, 1925    2 Sheets-Sheet 2
1,608,333
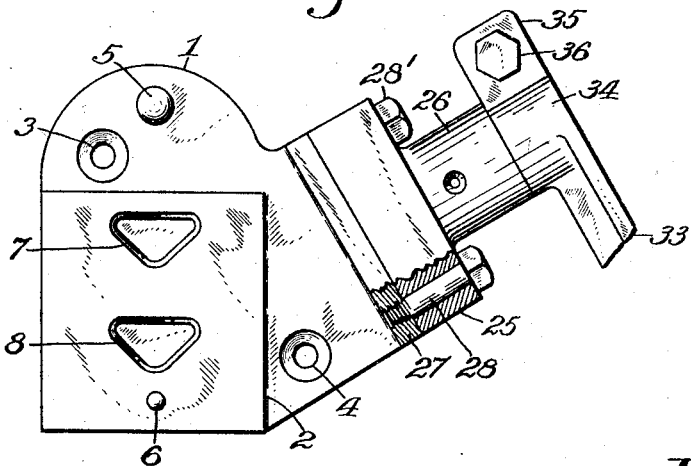
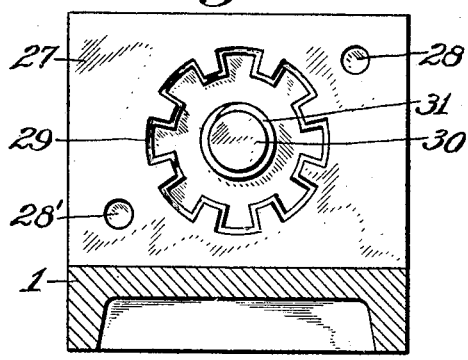
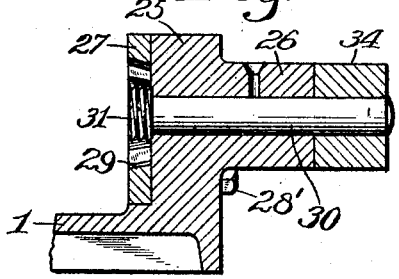
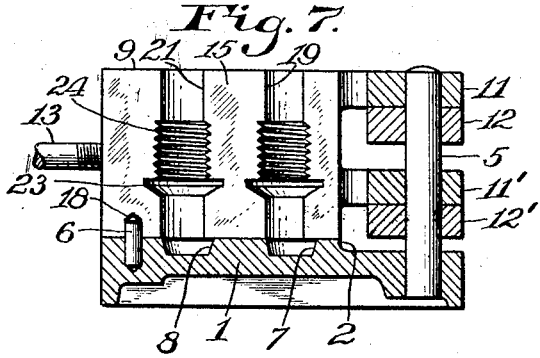
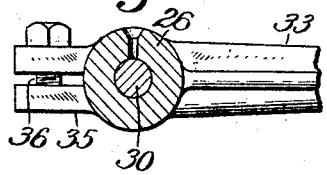
INVENTOR:
Carl F. Millican,
BY
E. T. Silvius,
ATTORNEY.

Patented Nov. 23, 1926.

1,608,333

UNITED STATES PATENT OFFICE.

CARL F. MILLICAN, OF INDIANAPOLIS, INDIANA.

COMBINATION DIE MOLD.

Application filed April 30, 1925. Serial No. 27,031.

This invention relates to a unitary operatable structure that is designed to be hand-controlled for die-casting small articles, and has reference more particularly to a combination mold that is adapted to be secured upon a work bench or table and be capable of molding a variety of articles, especially such articles as are intended to be used together, the combination mold being of such character as to be suitable for use in repair shops.

An object of the invention is to provide facilities for quickly producing small articles composed of lead or other material at small cost for time and labor.

Another object is to provide a combination die-mold which shall be so constructed as to have only a small number of parts which shall be simple and not costly to manufacture but shall be strong and reliable.

A further object is to provide a combination die-mold which shall have removable and interchangeable mold parts to afford ready facilities for molding a large variety of forms or shapes, without entailing the cost of a plurality of complete molding machines or appliances.

A still further object is to provide a die-casting apparatus which shall have mold parts so connected together as to permit them to be readily disassembled to cool them them when excessively heated as a result of long continued use, and which shall be durable and economical in use.

With the above-mentioned and other objects in view, the invention consists in a combination die-mold having a variety of mold bodies and forms, one mold body being adapted to cooperate alternately with a plurality of other mold bodies, the mold bodies being removably mounted in operative arrangement, the invention consisting also further in the novel parts and in the combinations and arrangements of parts as hereinafter particularly described and claimed.

Figure 1:
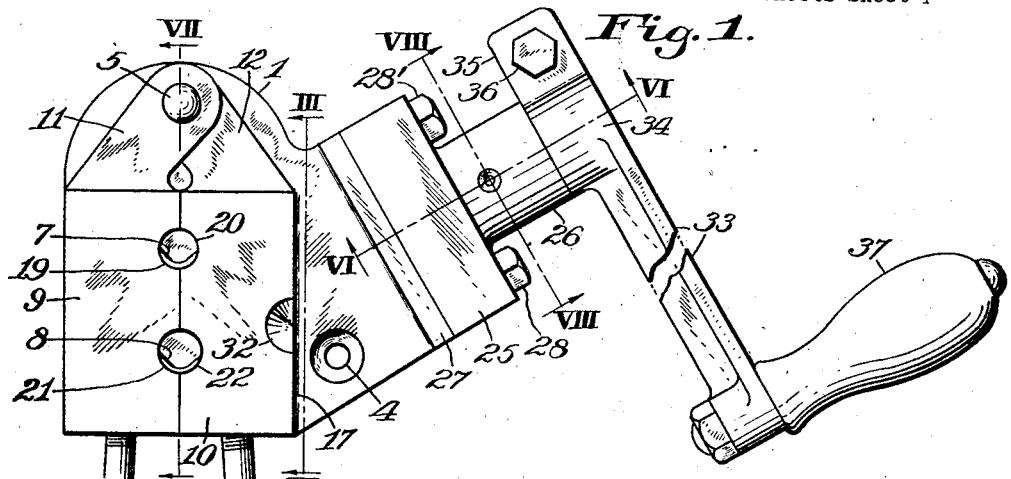
Figure 2:
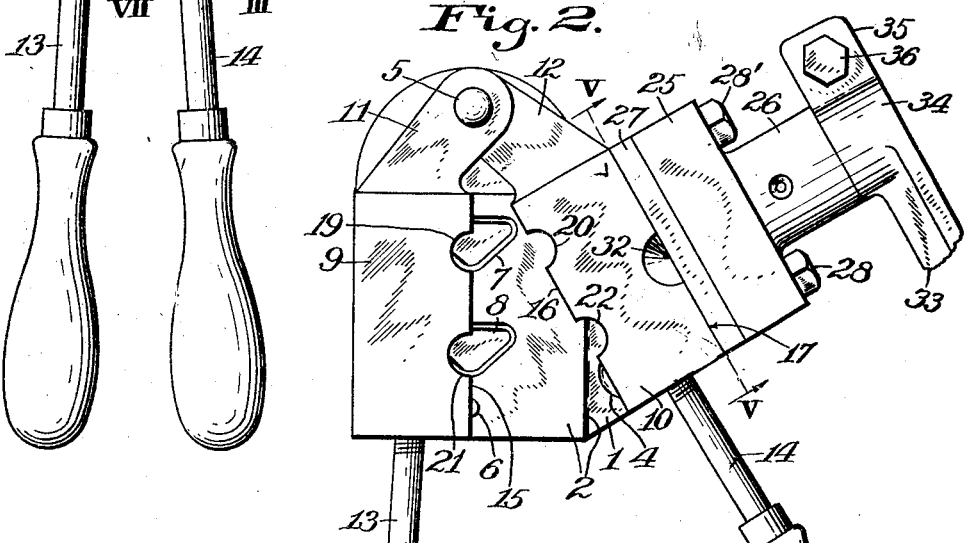
Figure 3:
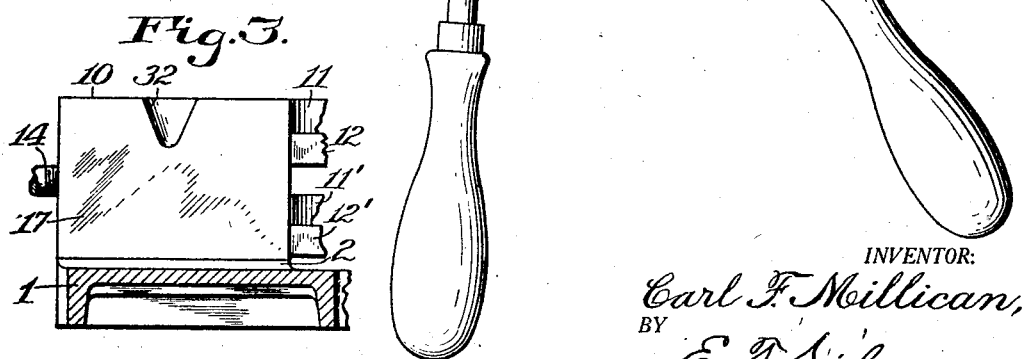

Referring to the drawings,—Figure 1 is a top plan of the combination mold in which the parts are properly arranged for molding articles in a suitable manner; Fig. 2 is a top plan of the combination mold in which parts are properly arranged for molding other types of articles advantageously; Fig. 3 is a fragmentary section approximately on the line III—III in Fig. 1; Fig. 4 is a top plan of the apparatus minus two of the principal parts thereof; Fig. 5 is a fragmentary sectional elevation approximately on the line V—V in Fig. 2 on an enlarged scale; Fig. 6 is a fragmentary section on the line VI—VI in Fig. 1; Fig. 7 is a sectional elevation on the line VII—VII in Fig. 1; and Fig. 8 is a sectional elevation on the line VIII—VIII in Fig. 1.

Similar reference characters in the various figures of the drawings indicate corresponding elements or features of construction herein referred to in detail.

A practical embodiment of the invention as preferably constructed comprises a suitable base 1, which may be composed of cast iron with a recess in the under side thereof, the top of the base having a relatively high table portion to constitute a mold table 2 having a true plane top surface, adapted to constitute a mold form bottom. The base preferably has countersink holes 3 and 4 to receive countersink head screws or bolts whereby to fasten the base to a bench or other support. The base is provided at a suitable distance from one edge of the table portion 2 with a vertical pivot stud 5 which is rigidly secured to the base so as to be at right angles to the top of the table portion 2, the top of the stud being rounded or slightly tapered. Adjacent to the opposite edge of the portion 2 a guide stud 6 is rigidly secured to the base so as to project upward upon the top of the portion 2. The table portion has mold cavaties 7 and 8 therein spaced apart between the stud 5 and the stud 6 in which to mold and cast bases of battery posts, the apparatus being illustrated as being adapted for molding such posts as are commonly used in the construction of electrical storage batteries. Two mold bodies 9 and 10 are provided which are arranged to be slidingly guided upon the top of the table portion 2, the mold body 9 having pivot ears 11 and 11' that are removably connected to the pivot stud 5, the body 10 having ears 12 and 12' that are removably connected also the pivot stud, so that the two body parts are hingedly connected together and may be together lifted to remove their ears from the pivot stud, permitting another mold form body to be readily connected to the stud. The bodies 9 and 10 are provided respectively with operating arms 13 and 14 which preferably are screwed into the bodies so as to permit removal therefrom to be likewise applied to other mold bodies. The bodies 9 and 10 have true plane faces 15 and 16 respectively that are to be brought together in alignment with the studs 5 and 6, and the body 10 has a true plane face 17 on its opposite side to constitute a side portion of a mold form, the faces 16 and 17 preferably being in parallelism. The lower portion of each body 9 and 10 has a recess 18 to receive a portion of the stud 6 when the faces 15 and 16 are brought together, the recesses being adjacent to the ends of the bodies to which the controlling arms are connected, the stud 6 being designed to hold the mold bodies correctly in proper position.

As an example of a form of article that may be molded, being posts, the bodies 9 and 10 have vertical grooves 19 and 20 oppositely arranged and normally above the cavity 7 and also relatively broader and deeper grooves 21 and 22 oppositely arranged above the cavity 8, each pair of grooves constituting a bore when the bodies are brought together, and each bore has a side cavity 23 adapted to mold a collar to support a battery cover, each bore having also screw threads 24 above the collar mold cavity to provide screw threads on the posts to which a nut may be connected to secure a battery cover in place. The upper portions of the bores permit metal to be poured into the post mold forms.

The base 1 has a head portion 25 upstanding thereon at a suitable distance from the table portion 2, preferably integral with the base, the outside of the head having an extension 26 to adapt the head to support a spindle, the opposite or inner side of the head having a die mold body 27 removably secured thereto by means of cap screws 28, 28', the mold body 27 being arranged at such degree of angularity as to permit full contact with a body 27 by the mold face 17 when the body 10 is swung pivotally a suitable distance away from the centering stud 6. The mold body 27 has a suitable cavity 29 to mold a nut form against the adjacent face of the head 25. A spindle 30 is rotatively mounted in the head and has a core portion and screw threads 31 thereon arranged in the cavity of the mold body 27 to mold threads in the nut, the opposite face of the nut being molded on the face 17 of the body 10, the face 17 having a tapered gate 32 in the upper portion thereof to conduct metal down to the cavity 29. The spindle 30 is provided with a crank arm 33 having a hub 34 receiving a portion of the spindle, the hub being provided with a clamp jaw 35 provided with a clamp screw 36, the arm 33 being provided with a handle 37. The hub 34 may be removed from the spindle to permit change of spindles having different screw threads thereon, when nuts of different diameters are required for different sizes of posts.

In practical use, the mold bodies 9 and 10 are brought together into contact with the centering posts 6 and held into position by means of the arms 13 and 14, after which molten metal is poured into the bores formed by the grooves in the faces 15 and 16, the metal flowing into the cavities 7 and 8. The metal quickly becomes set or hard and the bodies 9 and 10 are drawn apart so as to release the resulting castings, the castings being two posts having different diameters and each a base portion that is readily removed from the cavity in which it is cast. The mold body 10 may be swung over against the mold or die body 27 after which molten metal may be poured into the gate 32 until filled, the body 10 being promptly swung away from the body 27, after which the spindle 30 is rotated to cause the screw threads 31 to push the cast nut from the cavity 29. The metal formed in the gate 32 is readily clipped from the cast nut.

What is claimed as new is:

1. A combination die mold including a base having a stationary mold body and also a pivot stud fixed thereon, and two mold bodies hinged together on the pivot stud to mold an article, one of the two mold bodies being movable to the stationary mold body to co-operate therewith to mold another article.

2. A combination die mold including a base having a pivot stud and a centering stud fixed thereon, and a pair of mold bodies hinged together on the pivot stud to slide upon the base to the centering stud and each body to the other, the bodies together having a mold form therein leading to the top of the base.

3. A combination die mold including a base having two mold bodies spaced apart thereon, each body having an incomplete mold form therein presented each toward the other, and a two-faced mold body pivotally connected to the base to co-operate alternatively with the two mold bodies and complete the mold forms therein.

4. A combination die mold including two separately positioned mold bodies having each a mold cavity in the side thereof opposite to the other body, and a two-faced mold body arranged to operate between the two mold bodies and alternatively in co-operation therewith to present one of its faces to one and the other of its faces to the other of the two mold bodies for covering the cavities therein.

5. A combination die mold including a base having a plane top table portion thereon and also a pivot stud separate from the middle of the table portion, the table portion having a centering stud thereon and also two mold cavities between the studs, and two co-operating mold bodies to slide or to rest upon the top of the table portion and having each a guiding ear connected to the pivot stud, each mold body having a recess in its inner face to receive a portion of the centering stud and having also two mold concavities in its inner face to be positioned above the cavities respectively in the table portion to constitute post mold forms, each mold body having an operating arm.

6. In a combination die mold, the combination of a base, two mold bodies spaced apart and supported upon the base and having each a mold form cavity therein presented towards the other body, and a two-faced mold body pivotally connected with the base and movable alternatively to the two mold bodies to bring its faces into co-operation therewith and cover the cavities, the faces having each a groove in its upper portion to conduct a flow to the opposite cavity.

7. In a combination die mold, the combination of a base having a mold cavity in its top portion, a pair of mold bodies normally arranged together upon the base above the cavity to be separated slidingly on the base, each mold body having a post mold form concavity in its inner side opposite to the concavity in the other body and aligning with the cavity in the base, means pivotally connecting the mold bodies to the base and permitting independent movement of the bodies, and a stop device to guide the mold bodies together in normal arrangement.

In testimony whereof, I affix my signature on the 24th day of April, 1925.

CARL F. MILLICAN.